Feb. 25, 1930.  W. L. SCRIBNER  1,748,247
INKING ROLLER
Filed March 2, 1928

INVENTOR:
William L. Scribner
HIS ATTORNEYS.

Patented Feb. 25, 1930

1,748,247

UNITED STATES PATENT OFFICE

WILLIAM L. SCRIBNER, OF CANTON, OHIO, ASSIGNOR TO THE TIMKEN ROLLER BEARING COMPANY, OF CANTON, OHIO, A CORPORATION OF OHIO

INKING ROLLER

Application filed March 2, 1928. Serial No. 258,488.

This invention relates to inking rollers for printing presses. Its principal objects are to minimize the weight of the rotating portion, to provide for the mounting of said rotating portion on antifriction bearings that will take care of both the radial load and end thrust, and to provide a strong, light and simple support for such bearings. The invention consists in the parts and in the arrangements and combination of parts hereinafter described and claimed.

Figure 1:
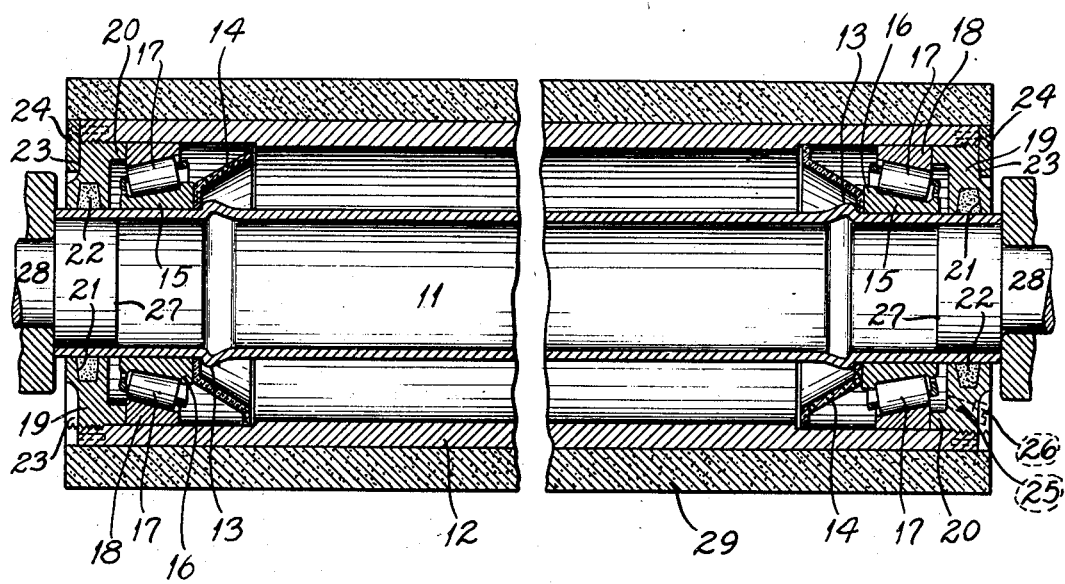
Figure 2:
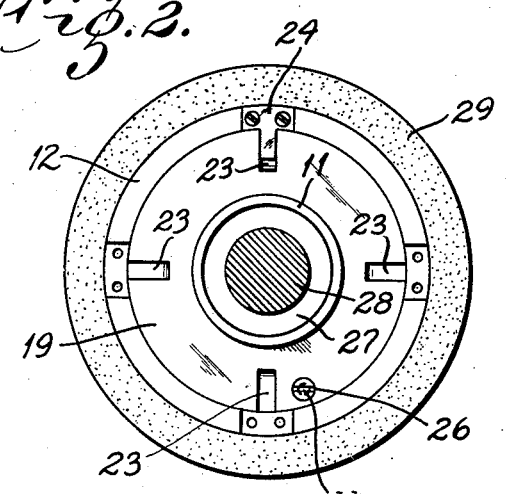

In the accompanying drawing, wherein like numerals refer to like parts wherever they occur, Fig. 1 is a longitudinal sectional view of a construction embodying my invention; and Fig. 2 is an end view thereof.

My construction comprises an inner member 11 in the form of an elongated tube, and an outer member 12 in the form of a hollow cylindrical shell spaced therefrom, with roller bearings interposed between the end portions of said inner and outer members. Near each end, the inner member has lugs or ribs 13 struck up therefrom to form outwardly extending abutments against which bear grease rings 14 of fiber or other suitable material whose periphery fits close enough to the inner surface of the outer shell to form a seal between the inner member and the outer shell. The outer surface of the end portions of the inner member are trued to receive bearing cones 15 that are fitted thereon, preferably with a light press-fit, the large ends of the cones bearing against the grease rings and such large ends being provided with thrust ribs 16 for the conical bearing rollers 17. The inner surfaces of the end portions of the outer shell are trued to receive the bearing cups 18 that cooperate with the series of rollers 17 interposed between them and the bearing cones, said cups having a sliding fit in the end portions of said outer shell. At its endmost portions, the outer shell is provided with internal screw-threads in which work threaded rings 19 that have inwardly extending flanges 20 arranged to abut against the large ends of the bearing cups. The inner surfaces of such rings are provided with circumferential grooves 21 in which fit grease rings 22 that bear against the inner member. Each of said threaded rings has a notch 23 in its outer face adapted to receive the inwardly extending tongue of a locking device 24 adapted to be screwed or otherwise secured to the end of the outer shell. By this arrangement, each bearing is adjusted by means of one of the threaded nuts, and is held in adjusted position by means of the locking device. Each of said rings has an opening 25 leading therethrough, which is provided with a suitable closure 26; whereby lubricant can be supplied to the bearings.

In each end of the inner member is mounted a plug 27, preferably by press-fitting said plug in said end. The projecting end 28 of the plug is of reduced diameter and made in the form of a spindle or shaft suitable for mounting in the printing press. The present invention contemplates that such spindles shall be fastened so as to hold the inner member against rotation and thus confine the rotary movement to the outer shell and parts connected therewith. In use, the outer shell is provided with a thick coat or layer 29 of the usual composition used for inking rollers.

It is obvious from the foregoing description that in practice the only parts that share in the rotary movement are the outer shell and parts attached thereto, including the antifriction rollers. It is also obvious that the integral tubular inner member is light, strong, simple and well adapted for taking care of both the radial load and the end thrust thereon. It is also obvious that the conical roller bearings are well adapted not only to take care of the radial and end thrust stresses but are easily adjustable for wear. It is also obvious that adequate provision has been made for lubrication and for preventing the leakage of the lubricant.

What I claim is:

An inking roller comprising a tubular inner member having plugs fitted in the ends thereof and having mounting projections extending therefrom, said inner member having outwardly extending ribs located inwardly from the ends thereof, a hollow shell surrounding said tubular inner member having shoulders located inwardly with relation to said ribs respectively, grease rings abutting against said ribs and said shoulders and closing the space between said inner member and said shell, bearing cones mounted on the end portions of said inner member with their large ends against said grease rings, bearing cups slidable in the end portions of said shell, conical rollers between said cones and said cups and devices adjustably mounted on said shell for positioning said cups.

Signed at Canton, Ohio, this 27th day of February, 1928.

WILLIAM L. SCRIBNER.